(12) United States Patent
Cherian et al.

(10) Patent No.: US 8,321,522 B2
(45) Date of Patent: Nov. 27, 2012

(54) SYSTEM AND METHOD FOR MANAGEMENT OF REMOTELY SHARED DATA

(75) Inventors: Jacob Cherian, Austin, TX (US); Kevin Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/069,858

(22) Filed: Mar. 23, 2011

(65) Prior Publication Data

US 2011/0173325 A1 Jul. 14, 2011

Related U.S. Application Data

(62) Division of application No. 12/210,421, filed on Sep. 15, 2008, now Pat. No. 7,930,361.

(51) Int. Cl.
*G06F 13/00* (2006.01)
(52) U.S. Cl. .................. 709/216; 709/214; 709/224
(58) Field of Classification Search .................. 709/213, 709/214, 216, 217, 219, 223, 224
See application file for complete search history.

(56) References Cited

U.S. PATENT DOCUMENTS

| 6,509,900 | B1 | 1/2003 | Ohsawa et al. ............... 345/543 |
| 6,950,800 | B1 | 9/2005 | McIntyre et al. ............... 705/1.1 |
| 6,990,573 | B2 | 1/2006 | Cherian et al. ................. 713/1 |
| 7,165,152 | B2 * | 1/2007 | Blumenau et al. ............ 711/152 |
| 7,197,606 | B2 | 3/2007 | Kobayashi et al. ............ 711/147 |
| 7,272,852 | B2 * | 9/2007 | Honda et al. ..................... 726/10 |
| 7,624,242 | B2 | 11/2009 | Savagaonkar et al. ......... 711/163 |
| 2004/0098366 | A1 * | 5/2004 | Sinclair et al. ..................... 707/1 |
| 2005/0216532 | A1 * | 9/2005 | Lallier ........................... 707/204 |
| 2005/0256968 | A1 | 11/2005 | Johnson ........................ 709/232 |
| 2009/0327900 | A1 | 12/2009 | Noll et al. ...................... 715/733 |

OTHER PUBLICATIONS

DC-09254, Dell Patent Application Entitled "System and Method for Deploying Information Handling System Images Through Fibre Channel", Chandrasekaran et al., 14 pages, 2007.
Response to Office Action filed Nov. 22, 2010 in U.S. Appl. No. 12/210,421, 16 pages, Nov. 22, 2010.
Office Action dated Sep. 14, 2010 in U.S. Appl. No. 12/210,421, 7 pages, Sep. 15, 2008.
Response to Election/Restriction Requirement filed Jul. 28, 2010 in U.S. Appl. No. 12/210,421, 8 pages, Jul. 28, 2010.
Election/Restriction Requirement dated Jul. 16, 2010 in U.S. Appl. No. 12/210,421, 6 pages, Jul. 16, 2010.

* cited by examiner

*Primary Examiner* — Viet Vu
(74) *Attorney, Agent, or Firm* — Baker Botts L.L.P.

(57) ABSTRACT

Systems and methods for reducing latency on a remotely-booted information handling system are disclosed. A method for access and management of remote data may include receiving from a host a standard input-output instruction including a persistent image update (PIU) parameter indicating a request by the host to access a shared computer-readable medium storing an image shared by the host and one or more other hosts. The method may further include determining a value of the PIU parameter and determining whether to allow the host to access the shared computer readable medium based at least on the value of the PIU parameter.

12 Claims, 6 Drawing Sheets

| BYTE/BIT | 7 | 6 | 5 | 4 | 3 | 2 | 1 | 0 |
|---|---|---|---|---|---|---|---|---|
| 0 | | | | OPERATION CODE (2Ah) | | | | |
| 1 | WRPROTECT | | | DPO | FUA | VOL_ 202 | FUA_NV | PIU ← 204 |
| 2 | (MSB) | | | LOGICAL BLOCK ADDRESS | | | | |
| 5 | | | | | | | | (LSB) |
| 6 | RESERVED | | | | | GROUP NUMBER | | |
| 7 | (MSB) | | | TRANSFER LENGTH | | | | |
| 8 | | | | | | | | |
| 9 | | | | CONTROL | | | | (LSB) |

FIG. 4 (400)

| BYTE/BIT | 7 | 6 | 5 | 4 | 3 | 2 | 1 | 0 |
|---|---|---|---|---|---|---|---|---|
| 0 | | | | OPERATION CODE (28h) | | | | |
| 1 | RDPROTECT | | | DPO | FUA | RESERVED | FUA_NV | PIU ← 404 |
| 2 | (MSB) | | | LOGICAL BLOCK ADDRESS | | | | |
| 5 | | | | | | | | (LSB) |
| 6 | RESERVED | | | | | GROUP NUMBER | | |
| 7 | (MSB) | | | TRANSFER LENGTH | | | | |
| 8 | | | | | | | | (LSB) |
| 9 | | | | CONTROL | | | | |

| CODE VALUE | TYPE DESCRIPTION |
|---|---|
| 00h | INITIATOR PORT NAME |
| 01h | INITIATOR PORT IDENTIFIER |
| 02h | INITIATOR DEVICE NAME |
| 03h | INDEX |
| 04h-EFh | RESERVED |
| F0h-FFh | VENDOR SPECIFIC |

| BYTE/BIT | 7 | 6 | 5 | 4 | 3 | 2 | 1 | 0 |
|---|---|---|---|---|---|---|---|---|
| 0 | OPERATION CODE (XXh) ⟋602 | | | | | | | |
| 1 | RESERVED | | | | | | | CRR ⟋604 |
| 2 | RESERVED | | | | | | | |
| 6 | | | | | | | | |
| 7 | (MSB) | | | | | | | |
| 8 | PARAMETER LIST LENGTH ⟋606 | | | | | | | (LSB) |
| 9 | CONTROL | | | | | | | |

| BYTE/BIT | 7 | 6 | 5 | 4 | 3 | 2 | 1 | 0 |
|---|---|---|---|---|---|---|---|---|
| 0 | RESERVED | | | | | | | |
| 1 | DESCRIPTOR TYPE ⟋612 | | | | | | | |
| 2 | (MSB) | | | | | | | |
| 9 | LOGICAL UNIT NUMBER ⟋614 | | | | | | | (LSB) |
| 10 | DESCRIPTOR LENGTH (n-10) ⟋616 | | | | | | | |
| 11 | (MSB) | | | | | | | |
| n | DESCRIPTOR DATA ⟋618 | | | | | | | (LSB) |

SYSTEM AND METHOD FOR MANAGEMENT OF REMOTELY SHARED DATA

RELATED APPLICATIONS

This application is a divisional of U.S. patent application Ser. No. 12/210,421 filed Sep. 15, 2008, now U.S. Pat. No. 7,930,361, the contents of which is incorporated herein in its entirety by this reference.

TECHNICAL FIELD

The present disclosure relates in general to information handling systems that access remotely shared data, and more particularly management of remotely shared data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures by which information handling systems boot their respective operating systems and/or access shared data remotely from storage resources via a network. Often, these architectures are employed for numerous reasons, including without limitation: (1) increased concern with the security of data-at-rest in information handling systems, particularly in portable computing devices (e.g., notebooks, laptops, and handhelds); and (2) simplified operating system and data management. However, in certain architectures, multiple physical or virtual information handling systems may share a common operating system image and/or data image, but such information handling systems may also require access to its own private data. In order to effectively access and manage such shared operating systems images and/or data, such architectures often require storage commands beyond those typically supported by industry-standard storage protocols (e.g., small computer system interface, or "SCSI", protocol). Accordingly, numerous proprietary, non-standard, storage protocols have arisen to manage shared operating system images and data.

SUMMARY

In accordance with the teachings of the present disclosure, the disadvantages and problems associated with access and management of remotely shared data have been substantially reduced or eliminated.

In one embodiment of the present disclosure, a method for access and management of remote data is provided. The method may include receiving from a host a standard input-output instruction including a persistent image update (PIU) parameter indicating a request by the host to access a shared computer-readable medium storing an image shared by the host and one or more other hosts. The method may further include determining a value of the PIU parameter and determining whether to allow the host to access the shared computer readable medium based at least on the value of the PIU parameter.

In another embodiment of the present disclosure, a method for access and management of remote data may be provided. The method may include receiving from an issuing host an access management instruction including a clear reference parameter indicating whether subsequent standard input/output instructions received from the issuing host are to be processed as if received from the issuing host or as if received from a non-issuing host. The method may also include determining a value of the clear reference parameter and processing subsequent standard input/output instructions from the issuing host based at least on the value of the clear reference parameter.

In an additional embodiment of the present disclosure, a system may include a plurality of hosts, at least one shared computer readable medium, at least one delta computer readable medium, and at least one storage processor. the at least one shared computer readable medium may store an image common to at least two of the plurality of hosts. Each delta computer readable medium may have stored thereon an image associated with one of the plurality of hosts. The storage processor may be configured to (i) receive from an issuing host included in the plurality of hosts a standard input-output instruction including a persistent image update (PIU) parameter indicating a request by the issuing host to access the shared computer readable medium; (ii) determine a value of the PIU parameter; and (iii) determining whether to allow the issuing host to access the shared computer readable medium based at least on the value of the PIU parameter.

In accordance with a further embodiment of the present disclosure, a system may include a plurality of hosts, at least one shared computer readable medium, at least one delta computer readable medium, and a storage processor. The at least one shared computer readable medium may store an image common to at least two of the plurality of hosts. Each delta computer readable medium having stored thereon an image associated with one of the plurality of hosts. The storage processor may be configured to (i) receive from an issuing host included in the plurality of hosts an access management instruction including a clear reference parameter indicating whether subsequent standard input/output instructions received from the issuing host are to be processed as if received from the issuing host or as if received from a non-issuing host included in the plurality of hosts; (ii) determine a value of the clear reference parameter; and (iii) process subsequent standard input/output instructions from the issuing host based at least on the value of the clear reference parameter.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a table representing various fields contained within a control descriptor block (CDB) for a 10-byte SCSI WRITE command that may be used to implement a WRITE in a remotely-shared storage system, in accordance with certain embodiments of the present disclosure;

FIG. 4 illustrates a table representing various fields contained within a control descriptor block (CDB) for a 10-byte SCSI READ command that may be used to implement a READ in a remotely-shared storage system, in accordance with certain embodiments of the present disclosure;

FIG. 5 illustrates a flow chart of an example method for processing the 10-byte READ command depicted in FIG. 4, in accordance with certain embodiments of the present disclosure;

FIGS. 6A-6C illustrate tables representing various fields contained within a control descriptor block (CDB) for a 10-byte SCSI SET READ REFERENCE command that may be used to allow a host to read to and write to a logical unit associated with another host, in accordance with certain embodiments of the present disclosure.

DETAILED DESCRIPTION

Figure 1:
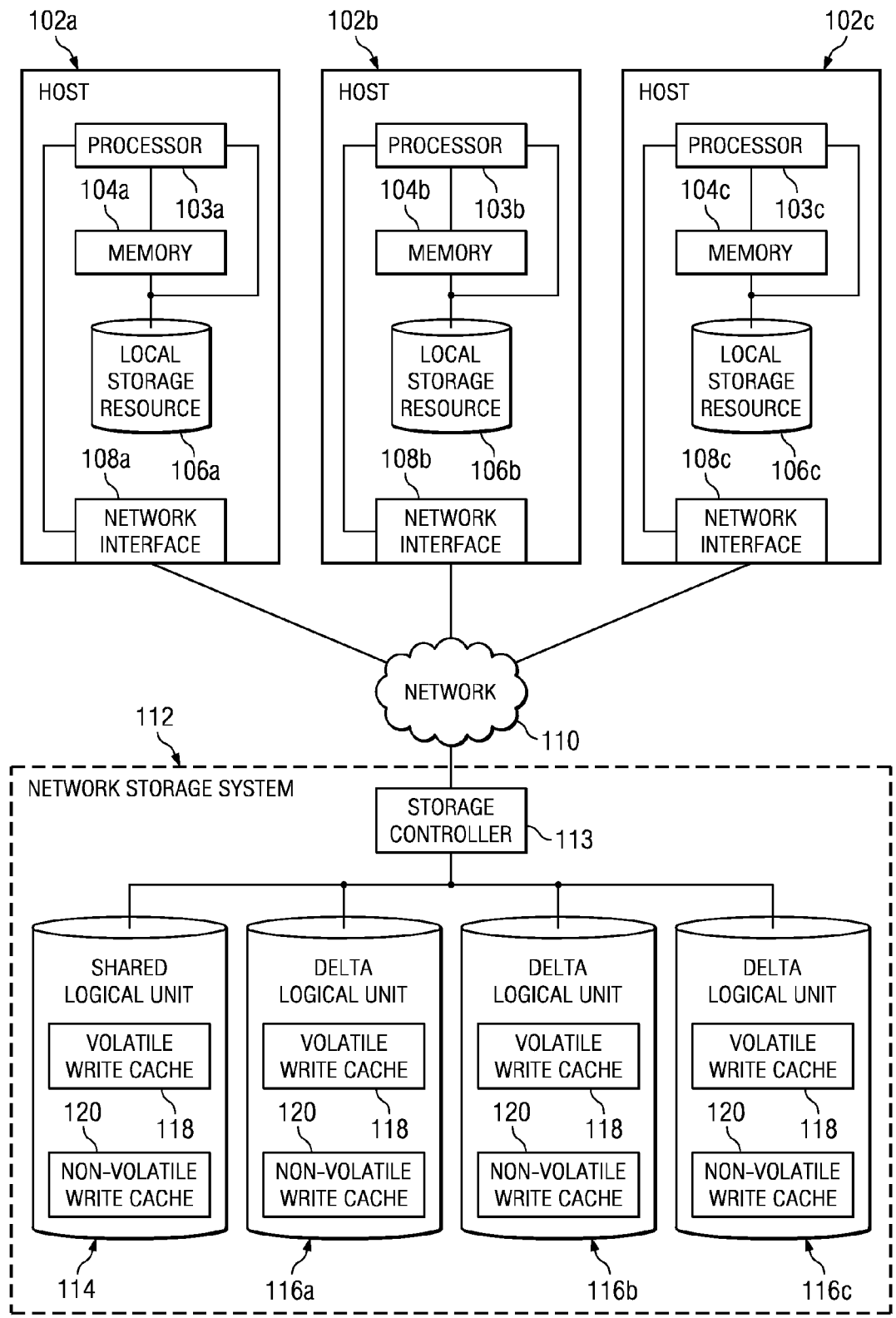
FIG. 1 illustrates a block diagram of an example system for the access and management of remotely shared data, in accordance with the present disclosure.

Preferred embodiments and their advantages are best understood by reference to FIGS. 1 through 7, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

FIG. 1 illustrates a block diagram of an example system 100 for the access and management of remotely shared data, in accordance with certain embodiments of the present disclosure. As depicted in FIG. 1, system 100 may comprise one or more hosts 102, a network 110, and a network storage system 112.

Each host 102 may comprise an information handling system and may generally be operable to receive data from and/or communicate data to one or more other information handling systems via network 110. In certain embodiments, one or more of hosts 102 may be a server. In the same or alternative embodiments, one or more of hosts 102 may be a personal computer. As depicted in FIG. 1, each host 102 may comprise a processor 103, a memory 104 communicatively coupled to its associated processor 103, a network interface 108 communicatively coupled to its associated processor 103, and a local storage resource 106 communicatively coupled to associated processor 103 and/or associated memory 104. For purposes of clarity, each information handling system may generally be referred to as "host 102" in the present disclosure.

Each processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, each processor 103 may interpret and/or execute program instructions and/or process data stored in an associated memory 104 and/or another component of an associated host 102.

Each memory 104 may be communicatively coupled to its associated processor 103 and may comprise any system, device, or apparatus operable to retain program instructions or data for a period of time (e.g., computer-readable media). Each memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Each local storage resource 106 may comprise computer-readable media (e.g., hard disk drive, floppy disk drive, CD-ROM, and/or other type of rotating storage media, flash memory, EEPROM, and/or other type of solid state storage media) and may be generally operable to store data.

Each network interface 108 may be any suitable system, apparatus, or device operable to serve as an interface between its associated host 102 and network 110. Each network interface 108 may enable its respective host 102 to communicate over network 110 using any suitable transmission protocol and/or standard, including without limitation all transmission protocols and/or standards enumerated below with respect to the discussion of network 110. In certain embodiments, network interface card 108 may comprise a network interface card, or "NIC."

Although system 100 is depicted as having three hosts 102, system 100 may include any number of hosts 102.

Network 110 may be a network and/or fabric configured to couple hosts 102 to network storage system 112. In certain embodiments, network 110 may allow hosts 102 to connect to logical units 114 and/or 116 disposed in network storage system 112 such that the logical units 114 and/or 116 appear to one or more hosts 102 as locally-attached storage resources. In the same or alternative embodiments, network 110 may include a communication infrastructure, which provides physical connections, and a management layer, which organizes the physical connections, logical units 114 and 116 of network storage system 112, and hosts 102. In the same or alternative embodiments, network 110 may allow block I/O services and/or file access services to logical units 114 and 116 disposed in network storage system 112. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As shown in FIG. 1, network storage system 112 may comprise a storage controller 113 and one or more logical units 114 and 116. Network storage system 112 may be communicatively coupled to hosts 102 and/or network 110, in order to facilitate communication of data between hosts 102 and logical units 114 and 116.

Storage controller 113 may be communicatively coupled to hosts 102 (e.g., via network 110) and/or one or more of logical units 114 and 116, and include any system, apparatus, or device operable to manage the communication of data between one or more of hosts 102 and one or more of logical units 114 and 116. In certain embodiments, storage controller 113 may provide functionality including, without limitation, disk aggregation and redundancy (e.g., RAID), input/output (I/O) routing, and error detection and recovery. Storage controller 113 may be implemented using hardware, software, or any combination thereof.

Although FIG. 1 depicts a single storage controller 113 system 100 may include any suitable number of storage controllers 113. In addition, although FIG. 1 depicts storage controller 113 interfaced between network 110 and logical units 114 and 116, other configurations of system 100 may be suitable (e.g., in some embodiments, storage controller may be interfaced between network 108 and hosts 102).

Logical units 114 and 116 may each be made up of one or more hard disk drives, magnetic tape libraries, optical disk drives, magneto-optical disk drives, compact disk drives, compact disk arrays, disk array controllers, and/or any other type of computer-readable media.

In the embodiment depicted in FIG. 1, logical unit 114 may be a "shared" logical unit that may include data and/or programs for use by more than one host 102. For example, shared logical unit 114 may include an operating system configured to run on more than one host 102. In addition or alternatively, shared logical unit 114 may serve as a boot logical unit to more than one host 102.

Also in the embodiment depicted in FIG. 1, one or more of logical units 116 may include a dedicated logical unit that may include data and/or programs for use by a particular host 102. For example, logical unit 116a may include data and/or programs for use by host 102a, logical unit 116b may include data and/or programs for use by host 102b, and logical unit 116c may include data and/or programs for use by host 102c. In certain embodiments, one or more of logical units 116 may be a "delta" logical unit that includes the differences or "deltas" from the shared logical unit 114 that are associated with a particular host 102. Delta logical units 116 may be implemented using any suitable technique, including, for example, copy-on-write, redirect-on-write, and/or other suitable snapshot technologies.

In some embodiments, network storage system 112 may include one or more storage enclosures configured to hold and power one or more physical storage resources comprising logical units 114 and 116. In such embodiments, such storage enclosures may be communicatively coupled to one or more of hosts 102 and/or network 110, in order to facilitate communication of data between hosts 102 and logical units 114 and 116.

Although the embodiment shown in FIG. 1 depicts system 100 having four logical units 114, 116, network storage system 110 may have any number of logical units 114, 116.

As shown in FIG. 1, each logical unit 114 and 116 may include or have associated therewith a volatile write cache 118 and/or a non-volatile write cache 120. Each write cache 118 and 120 may include any computer-readable medium (e.g., a memory) communicatively coupled to its associated logical unit 114 or 116. In operation, write caches 118 and/or 120 may be used to speed up and/or increase the efficiency of writing data to one or more of logical units 114 and/or 116. For example, when data from a host 102 is to be written to a logical unit 114 and/or 116, rather than immediately store the data onto a logical unit's persistent storage (e.g., hard disk drives), the data may be instead be stored in a write cache 118 or 120 and a signal may be communicated to the host 102 issuing the write command that the data has been successfully stored. This may significantly speed up the acknowledgment back to host 102 that the data has been successfully stored, allowing host 102 to proceed to other tasks. Then, when it is convenient for the appropriate logical unit 114 or 116 to do so, the data in the designated write cache 118 or 120 may be flushed to the persistent storage area of the logical unit 114 or 116, where it becomes "permanently" stored.

As depicted in FIG. 1, write caches may be classified as a volatile cache 118 or a non-volatile cache 120. Each volatile write cache 118 comprises a write cache that does not maintain the storage of cached data when power is removed from the volatile write cache 118. On the other hand, each non-volatile write cache 120 comprises a write cache that does maintain the storage of cached data when power is removed from the non-volatile write cache 120.

FIG. 2 illustrates a table representing various fields contained within a control descriptor block (CDB) 200 for a 10-byte SCSI WRITE command that may be used to implement a WRITE in a remotely-shared storage system (e.g., system 100), in accordance with certain embodiments of the present disclosure. In the depicted embodiment, CDB 200 is identical to a standard 10-byte SCSI WRITE command, with the exception that CDB 200 includes a VOL (volatile) bit 202 at Byte 1, Bit 2 (replacing a reserved bit of a standard 10-byte SCSI WRITE command) and includes a PIU (persistent image update) bit 204 at Byte 1, Bit 0 (replacing an obsolete bit of a standard 10-byte SCSI WRITE command). Although VOL bit 202 and PIU bit 204 are depicted as residing at particular bit positions within CDB 200, VOL bit 202 and/or PIU bit 204 may reside at any suitable bit position within CDB 200.

VOL bit 202 as depicted in FIG. 2 may indicate the volatility of a WRITE command. For example, if VOL bit 202 is set to 1, it may indicate a WRITE command that is not crucial to the data integrity of system 100 should power be lost, for example a WRITE to a temporary file. Because such a "volatile WRITE" is not crucial to data integrity, no crucial data is lost if the volatile WRITE is not committed to non-volatile storage prior to loss of power. Accordingly, by labeling a WRITE as volatile, system 100 is able to designate a low-priority status on the volatile WRITE in terms of having the WRITE stored to non-volatile storage, and may accordingly further increase storage and processing efficiency.

PIU (persistent image update) bit 204 as depicted in FIG. 2 may indicate that a WRITE command is to be a persistent WRITE to a shared logical unit 114 common to one or more hosts 102, as opposed to a WRITE to a delta logical unit 116 associated with a particular host 102.

Figure 3:
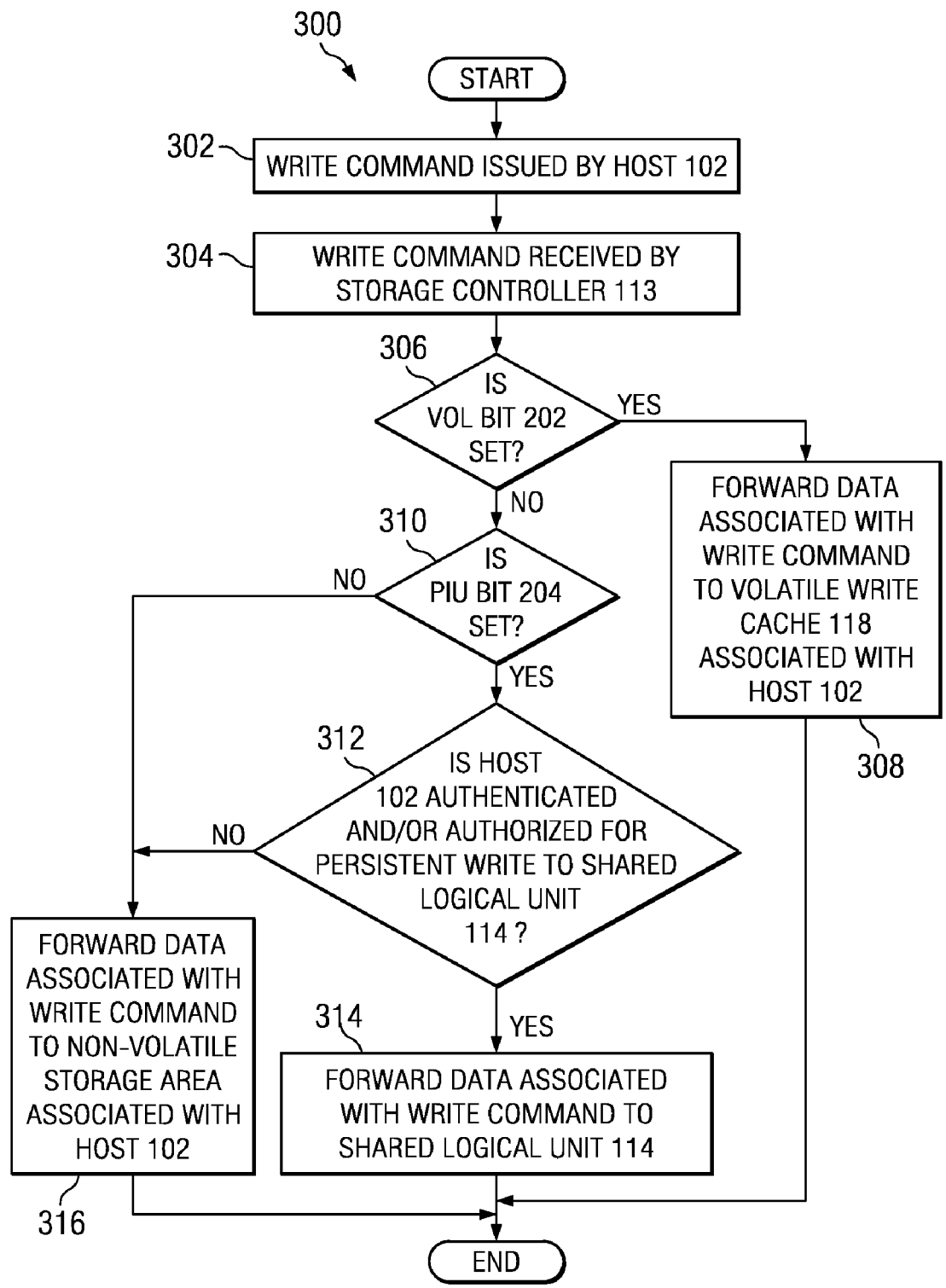
FIG. 3 illustrates a flow chart of an example method for processing the 10-byte WRITE command depicted in FIG. 2, in accordance with certain embodiments of the present disclosure.

FIG. 3 illustrates a flow chart of an example method 300 for processing the 10-byte WRITE command represented by CDB 200, in accordance with certain embodiments of the present disclosure. According to one embodiment, method 300 preferably begins at step 302. As noted above, teachings of the present disclosure may be implemented in a variety of configurations of system 100 and CDB 200. As such, the preferred initialization point for method 300 and the order of the steps 302-316 comprising method 300 may depend on the implementation chosen.

At step 302, a WRITE command may issue from a particular host 102. The WRITE command may then be communicated to and received by storage controller 113 at step 304.

At step 306, storage controller 113 and/or another suitable component of system 100 may determine whether VOL bit 202 of the WRITE command is set. If VOL bit 202 is set, method 300 may proceed to step 308. Otherwise, if VOL bit 202 is not set, method 300 may proceed to step 310.

At step 308, in response to a determination that VOL bit 202 is set, storage controller 113 and/or another suitable component of system 100 may forward the WRITE command's associated data to a volatile write cache 118 associated with host 102 or another suitable volatile storage area associated with host 102 (e.g., a temporary cache on host 102). After completion of step 308, method 300 may end.

At step 310, in response to a determination that VOL bit 202 is not set, storage controller 113 and/or another suitable component of system 100 may determine whether PIU bit 204 of the WRITE command is set. If PIU bit 204 is set, method 300 may proceed to step 312. Otherwise, if PIU bit 202 is not set, method 300 may proceed to step 316.

At step 312, in response to a determination that PIU bit 204 is set, storage controller 113 and/or another suitable component of system 100 may determine whether host 102 is authenticated and/or authorized to issue a persistent WRITE to shared logical unit 114. Such authentication and/or authorization could follow any suitable authentication method, including without limitation T10 Capabilities-based Command Security (CbCS) or SCSI-based Internet Key Exchange Protocol (IKE). If host 102 is authenticated and/or authorized to issue a persistent WRITE to shared logical unit 114, method 300 may proceed to step 314. Otherwise, if host 102 is not authenticated and/or authorized to issue a persistent WRITE to shared logical unit 114, method 300 may proceed to step 316. In alternative embodiments, if the PIU bit 204 is set and a WRITE command issued from a non-authenticated and/or non-authorized host 102, storage controller 113 may communicate a CHECK CONDITION status to the host 102 indicating an invalid command.

At step 314, in response to a determination that host 102 is authenticated and/or authorized to issue a persistent WRITE to shared logical unit 114, storage controller 113 and/or another suitable component of system 100 may forward the WRITE command's associated data to shared logical unit 114. After completion of step 314, method 300 may end.

At step 316, in response to a determination that PIU bit 204 is not set or a determination that host 102 is not authenticated and/or authorized to issue a persistent WRITE to shared logical unit 114, storage controller 113 and/or another suitable component of system 100 may forward the WRITE command's associated data to a non-volatile storage area associated with host 102 (e.g., a delta logical unit 116 or a non-volatile write cache 120). After completion of step 316, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. For example, in certain embodiments, step 312 may be executed prior to step 310.

Method 300 may be implemented using system 100 or any other system operable to implement method 300. In addition, method 300 or similar methods may be used to process write-oriented commands other than the 10-byte WRITE command depicted in FIG. 2. For example, methods identical or similar to method 300 may be used in connection with a 12-byte WRITE command, a 16-byte WRITE command, a 10-byte WRITE WITH VERIFY command, a 12-byte WRITE with verify command, and a 32-byte XPWRITE command. In certain embodiments, method 300 may be implemented partially or fully in software embodied in computer-readable media.

FIG. 4 illustrates a table representing various fields contained within a control descriptor block (CDB) 400 for a 10-byte SCSI READ command that may be used to implement a READ in a remotely-shared storage system (e.g., system 100), in accordance with certain embodiments of the present disclosure. In the depicted embodiment, CDB 400 is identical to a standard 10-byte SCSI READ command, with the exception that CDB 400 includes a PIU bit 404 at Byte 1, Bit 0 (replacing an obsolete bit of a standard 10-byte SCSI READ command). Although PIU bit 404 is depicted as residing at particular bit positions within CDB 400, PIU bit 204 may reside at any suitable bit position within CDB 400.

PIU bit 404 as depicted in FIG. 4 may indicate that a READ command is to be from a shared logical unit 114 common to one or more hosts 102, as opposed to a READ from a delta logical unit 116 associated with a particular host 102.

Figures 5, 6C:
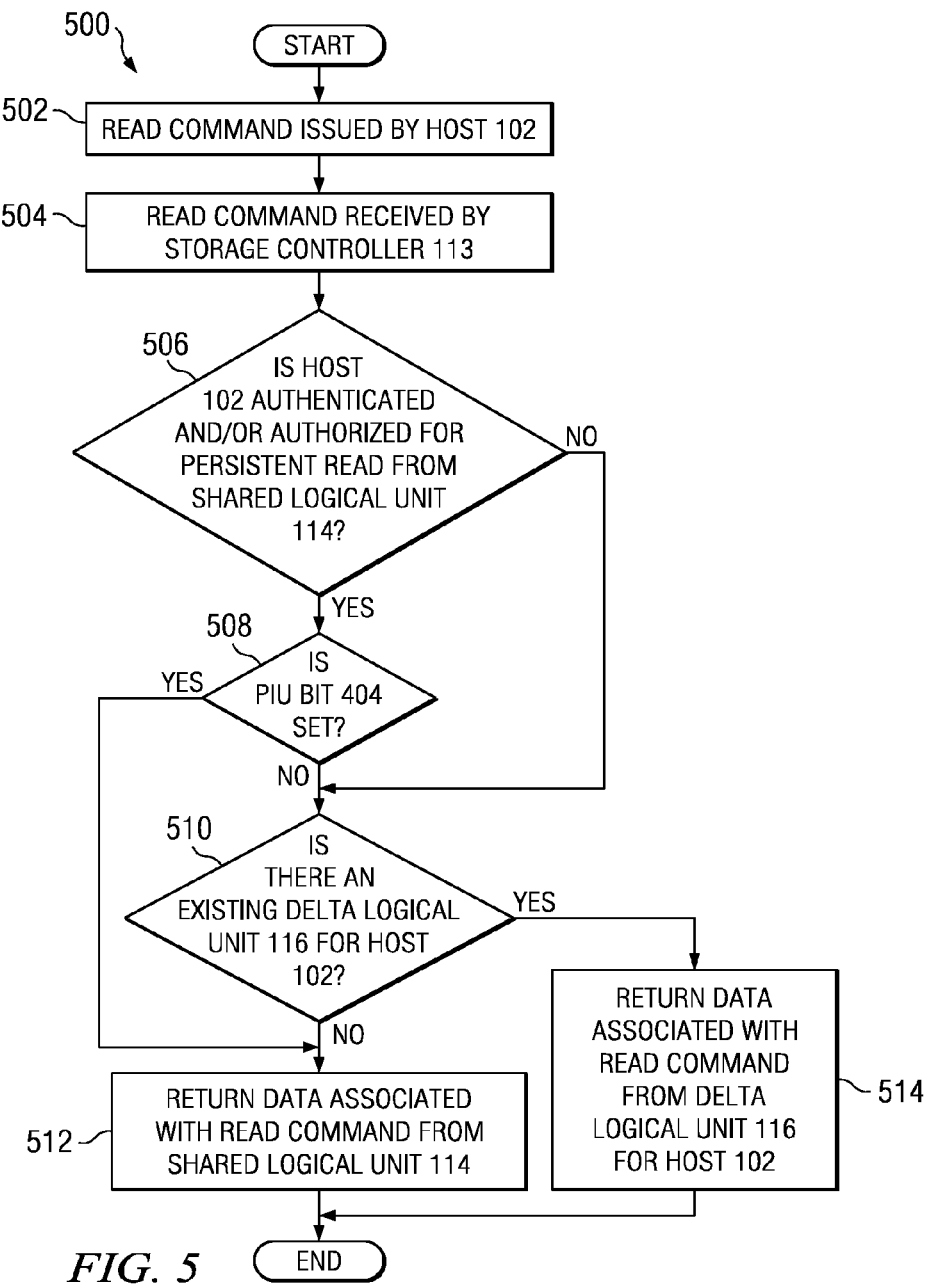

FIG. 5 illustrates a flow chart of an example method 500 for processing the 10-byte READ command represented by CDB 400, in accordance with certain embodiments of the present disclosure. According to one embodiment, method 500 preferably begins at step 502. As noted above, teachings of the present disclosure may be implemented in a variety of configurations of system 100 and CDB 400. As such, the preferred initialization point for method 500 and the order of the steps 502-514 comprising method 500 may depend on the implementation chosen.

At step 502, a READ command may issue from a particular host 102. The READ command may then be communicated to and received by storage controller 113 at step 504.

At step 506, storage controller 113 and/or another suitable component of system 100 may determine whether host 102 is authenticated and/or authorized to issue a persistent READ command to shared logical unit 114. Such authentication and/or authorization could follow any suitable authentication method, including without limitation T10 CbCS or SCSI-based IKE. If host 102 is authenticated and/or authorized to issue a persistent READ command to shared logical unit 114, method 500 may proceed to step 508. Otherwise, if host 102 is not authenticated and/or authorized to issue a persistent READ command to shared logical unit 114, method 500 may proceed to step 510.

At step 508, in response to a determination that host 102 is authenticated and/or authorized to issue a persistent READ command to shared logical unit 114, storage controller 113 and/or another suitable component of system 100 may determine whether PIU bit 404 of the READ command is set. If PIU bit 404 is set, method 500 may proceed to step 512. Otherwise, if PIU bit 402 is not set, method 500 may proceed to step 510, At step 510, in response to a determination that PIU bit 404 is not set, storage controller 113 and/or another suitable component of system 100 may determine whether a delta logical unit 116 and/or snapshot associated with host 102 exists. If such a delta logical unit 116 or snapshot exists, data and/or content associated with host 102 may have changed from that existing on the shared logical unit 114, and method 500 may proceed to step 514. Otherwise, if such a delta logical unit 116 or snapshot does not exist, data and/or content associated with host 102 may not have changed from that existing on the shared logical unit 114, and method 500 may proceed to step 512.

At step 512, in response to a determination that a delta logical unit 116 and/or snapshot associated with host 102 does not exist or in response to a determination that PIU bit 404 is set, storage controller 113 and/or another component of system 100 may return the READ command's associated data from the shared logical unit 114. After completion of step 512, method 500 may end.

At step 514, in response to a determination that a delta logical unit 116 and/or snapshot associated with host 102 exists, storage controller 113 and/or another component of system 100 may return the READ command's associated data from the delta logical unit 116 associated with host 102. After completion of step 514, method 500 may end.

Although FIG. 5 discloses a particular number of steps to be taken with respect to method 500, method 500 may be executed with greater or lesser steps than those depicted in FIG. 5. In addition, although FIG. 5 discloses a certain order of steps to be taken with respect to method 500, the steps comprising method 500 may be completed in any suitable order. For example, in certain embodiments, step 508 may be executed prior to step 506.

Method 500 may be implemented using system 100 or any other system operable to implement method 500. In addition, method 500 or similar methods may be used to process read-oriented commands other than the 10-byte READ command depicted in FIG. 4. For example, methods identical or similar to method 500 may be used in connection with a 12-byte READ command, a 16-byte READ command, and a 32-byte READ command. In certain embodiments, method 500 may be implemented partially or fully in software embodied in computer-readable media.

FIGS. 6A-6C illustrate tables representing various fields contained within a control descriptor block (CDB) 600 for a 10-byte SCSI SET READ REFERENCE command that may be used to allow a host 102 to read from and write to a logical unit associated with another host 102, in accordance with certain embodiments of the present disclosure. In the depicted embodiment, CDB 600 defines a new command that allows an authenticated and/or authorized host 102 to access a delta logical unit 116 associated with another host 102 or to access an image of shared logical unit 114 as seen by another host 102. As shown in FIG. 6A, CDB 600 may include an operation code field 602, clear read reference (CRR) bit 604, and parameter list length field 606. Although operation code field 602, CRR bit 604, and parameter list length field 606 are depicted as residing at particular bit positions within CDB 600, operation code field 602, CRR bit 604, and parameter list length field 606 may reside at any suitable bit position within CDB 600.

Operation code field 602 as depicted in FIG. 6A may include an operation code that may indicate to storage controller 113 or another component of system 100 that the command is a SET READ REFERENCE command.

CRR bit 604 as depicted in FIG. 6A may indicate whether the current SET READ REFERENCE command issued by a host 102 is clearing a read reference previously set by a SET READ REFERENCE command for the host 102, or whether the current SET READ REFERENCE command is being issued in order to allow the issuing host 102 to access logical units associated with a different host 102 (e.g., a SET READ REFERENCE command may allow host 102a to access logical units 114 and 116 as if host 102a were host 102b).

Parameter list length field 606 as depicted in FIG. 6A may indicate the byte length of the descriptor parameter 610 that may be passed along with the SET READ REFERENCE command. When CRR bit 604 indicates that the SET READ REFERENCE command is being issued to allow the command issuing host 102 access to a logical unit 114 and 116 associated with a different non-issuing host 102 (e.g., a host 102 for which CRR bit is not set), the descriptor parameter 610 depicted in FIG. 6B may be passed along with the SET READ REFERENCE COMMAND in order to identify the non-issuing host 102 and the logical units 114 and 116 of the non-issuing host 102 to be accessed by the issuing host 102.

As depicted in FIG. 6B, descriptor parameter 610 may include a descriptor type field 612, a logical unit number field 614, a descriptor length field 616, and a descriptor data field 618. Although descriptor type field 612, a logical unit number field 614, a descriptor length field 616, and a descriptor data field 618 are depicted as residing at particular bit positions within descriptor parameter 610, descriptor type field 612, a logical unit number field 614, a descriptor length field 616, and a descriptor data field 618 may reside at any suitable bit position within descriptor parameter 610.

Descriptor type field 612 as depicted in FIG. 6B may specify a descriptor type used to identify the non-issuing host 102 whose logical units 114 and 116 are to be accessed by the issuing host 102. The table set forth in FIG. 6C sets forth example descriptor types that may be used to identify the non-issuing host 102, as well as hexadecimal code values that may be associated with such example descriptor types. As shown in FIG. 6C, the non-issuing host 102 may be identified by its initiator port name, initiator port identifier, initiator device name, index, a vendor-specific identifier, or any other suitable identifier.

Logical unit number 614 as depicted in FIG. 6B may indicate a logical unit 114 or 116 associated with the non-issuing host 102 that may be accessed by the issuing host 102 of the SET READ REFERENCE command.

Descriptor length field 616 as depicted in FIG. 6B may indicate the byte length of descriptor data field 618.

Descriptor data field 618 as depicted in FIG. 6B may identify the non-issuing host 102 (using the descriptor type identified in descriptor type field 612) whose logical units 114 and 116 may be accessed by the issuing host 102 of the SET READ REFERENCE command.

Figure 7:
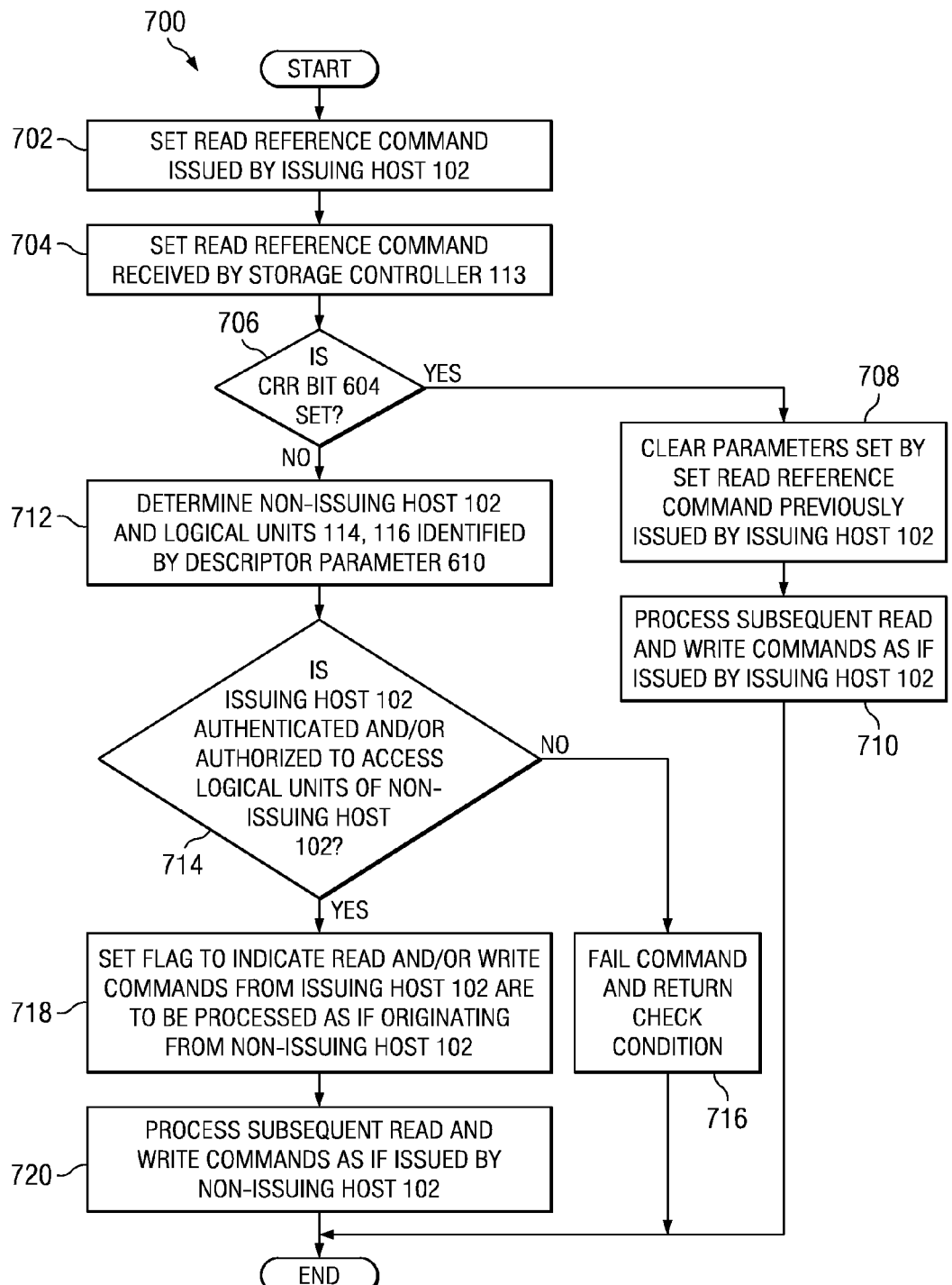
FIG. 7 illustrates a flow chart of an example method 700 for processing the SET READ REFERENCE command depicted in FIG. 6, in accordance with certain embodiments of the present disclosure.

FIG. 7 illustrates a flow chart of an example method 700 for processing the SET READ REFERENCE command represented by CDB 600, in accordance with certain embodiments of the present disclosure. According to one embodiment, method 700 preferably begins at step 702. As noted above, teachings of the present disclosure may be implemented in a variety of configurations of system 100 and CDB 600. As such, the preferred initialization point for method 700 and the order of the steps 702-720 comprising method 700 may depend on the implementation chosen.

At step 702, a SET READ REFERENCE command may issue from a particular issuing host 102. The SET READ REFERENCE command may then be communicated to and received by storage controller 113 at step 704.

At step 706, storage controller 113 and/or another suitable component of system 100 may determine whether CRR bit 604 of the SET READ REFERENCE command is set. If CRR bit 604 is set, method 700 may proceed to step 708. Otherwise, if CRR bit 604 is not set, method 700 may proceed to step 712.

At step 708, in response to a determination that CRR bit 604 is set, storage controller 113 and/or another suitable component of system 100 may clear parameters associated by a SET READ REFERENCE command previously issued by issuing host 102.

At step 710, storage controller 113 and/or another suitable component of system 100 may process subsequent READ and WRITE commands issued by issuing host 102 as if they were issued by issuing host 102. After completion of step 710, method 700 may end.

At step 712, in response to a determination that CRR bit 604 is not set, storage controller 113 and/or another suitable component of system 100 may determine the identity of the non-issuing host 102 and logical units 114 and 116 identified by descriptor parameter 610.

At step 714, storage controller 113 and/or another suitable component of system 100 may determine whether issuing host 102 is authenticated and/or authorized to access logical units 114 and/or 116 of the non-issuing host 102 identified in step 712. Such authentication could follow any suitable authentication method, including without limitation T10 CbCS or SCSI-based IKE. If host 102 is not authenticated and/or authorized to access logical units 114 and/or 116 of the non-issuing host 102, method 700 may proceed to step 716. Otherwise, if host 102 is authenticated and/or authorized to access logical units 114 and/or 116 of the non-issuing host 102, method 700 may proceed to step 718.

At step 716, in response to a determination that host 102 is not authenticated and/or authorized to access logical units 114 and/or 116 of the non-issuing host 102, storage controller 113 and/or another suitable component of system 100 may fail the SET READ REFERENCE command and return a CHECK CONDITION. After completion of step 716, method 700 may end.

At step 718, in response to a determination that host 102 is authenticated and/or authorized to access logical units 114 and/or 116 of the non-issuing host 102, storage controller 113 and/or another suitable component of system 100 may set a flag and/or other variable to indicate that READ and/or WRITE commands from issuing host 102 are to be processed as if originating from non-issuing host 102.

At step 720, storage controller 113 and/or another suitable component of system 100 may process subsequent READ and WRITE commands issued by issuing host 102 as if they were issued by non-issuing host 102. After completion of step 720, method 700 may end.

Although FIG. 7 discloses a particular number of steps to be taken with respect to method 700, method 700 may be executed with greater or lesser steps than those depicted in FIG. 7. In addition, although FIG. 7 discloses a certain order of steps to be taken with respect to method 700, the steps comprising method 700 may be completed in any suitable order.

Method 700 may be implemented using system 100 or any other system operable to implement method 700. In addition, method 700 or similar methods may be used to commands other than the 10-byte SET READ REFERENCE command depicted in FIG. 7. In certain embodiments, method 700 may be implemented partially or fully in software embodied in computer-readable media.

Using the methods and systems disclosed herein, problems associated with conventional approaches to access and management of remotely shared data may be improved, reduced, or eliminated. For example, the methods and systems disclosed herein provide input/output commands for access and management of remotely shared data using an existing I/O standard (e.g., SCSI), thus reducing or eliminating the need for proprietary or non-standard I/O commands.

Although the present disclosure has been described in detail, it should be understood that various changes, substitutions, and alterations can be made hereto without departing from the spirit and the scope of the disclosure as defined by the appended claims.

What is claimed is:

1. A method for access and management of remote data, comprising:

receiving from an issuing host an access management instruction including a clear reference parameter indicating whether subsequent standard input/output instructions received from the issuing host are to be processed as if received from the issuing host or as if received from a non-issuing host;

determining a value of the clear reference parameter, wherein the clear reference parameter includes a bit;

determining whether the issuing host has been authorized to access one or more computer readable media associated with the non-issuing host if the clear reference parameter bit is not set; and processing subsequent standard input/output instructions from the issuing host as if received from the non-issuing host if the issuing host has been authorized to access the one or more computer readable media associated with the non-issuing host.

2. A method according to claim 1, further comprising processing subsequent standard input/output instructions from the issuing host as if received from the issuing host if the clear reference parameter bit is set.

3. A method according to claim 1, wherein the instruction includes host parameter information identifying at least one of the non-issuing host and at least one computer readable medium associated with the non-issuing host, the method further comprising:

processing the identifying information; and processing subsequent standard input/output instructions from the issuing host as if received from the non-issuing host based at least on the identifying information.

4. A method according to claim 1, wherein the subsequent standard input/output instructions include at least one of a read-oriented instruction and a write-oriented instruction.

5. A method according to claim 1, wherein the subsequent standard input/output instructions include small computer system interface (SCSI) input-output instructions.

6. A method according to claim 1, wherein the access management instruction includes a small computer system interface (SCSI) input-output instruction.

7. A system comprising:

a plurality of hosts;

at least one shared computer readable medium storing an image common to at least two of the plurality of hosts;

at least one delta computer readable medium, each delta computer readable medium having stored thereon an image associated with one of the plurality of hosts; and a storage processor configured to:

receive from an issuing host included in the plurality of hosts an access management instruction including a clear reference parameter indicating whether subsequent standard input/output instructions received from the issuing host are to be processed as if received from the issuing host or as if received from a non-issuing host included in the plurality of hosts;

determine a value of the clear reference parameter, wherein the clear reference parameter includes a bit;

determine whether the issuing host has been authorized to access one or more computer readable media associated with the non-issuing host if the clear reference parameter bit is not set; and process subsequent standard input/output instructions from the issuing host as if received from the non-issuing host if the issuing host has been authorized to access the one or more computer readable media associated with the non-issuing host.

8. An information handling system according to claim 7, wherein the access management instruction includes a small computer system interface (SCSI) input-output instruction.

9. A system according to claim 7, wherein the storage processor is further configured to process subsequent standard input/output instructions from the issuing host as if received from the issuing host if the clear reference parameter bit is set.

10. A system according to claim 7, wherein the instruction includes host parameter information identifying at least one of the non-issuing host and at least one computer readable medium associated with the non-issuing host, the storage processor further configured to:

process the identifying information; and process subsequent standard input/output instructions from the issuing host as if received from the non-issuing host based at least on the identifying information.

11. A system according to claim 7, wherein the subsequent standard input/output instructions include at least one of a read-oriented instruction and a write-oriented instruction.

12. A system according to claim 7, wherein the subsequent standard input/output instructions include small computer system interface (SCSI) input-output instructions.

* * * * *